(12) United States Patent
Bisbee et al.

(10) Patent No.: US 7,062,620 B1
(45) Date of Patent: Jun. 13, 2006

(54) DUAL POWER BUS DATA STORAGE SYSTEM

(75) Inventors: David C. Bisbee, Princeton, MA (US); Scot C. Tata, Blackstone, MA (US); Erik C. Nelson, Upton, MA (US); Thomas Delucia, Milford, MA (US); Thomas E. Linnell, Northboro, MA (US); William R. Tuccio, Sutton, MA (US); Edward J. Claprood, Southboro, MA (US); Enrico DiFabio, Cranston, RI (US); Brian Gallagher, Southboro, MA (US); Lawrence G. Pignolet, Mapleville, RI (US)

(73) Assignee: EMC Corporation, Hopkinton, MA (US)

( * ) Notice: Subject to any disclaimer, the term of this patent is extended or adjusted under 35 U.S.C. 154(b) by 430 days.

(21) Appl. No.: 10/331,423

(22) Filed: Dec. 30, 2002

(51) Int. Cl.
*G00F 12/00* (2006.01)

(52) U.S. Cl. .......................... 711/162; 711/4; 711/112; 711/114; 714/5; 714/6

(58) Field of Classification Search ........ 365/226–229; 714/5–6, 11–14; 711/4, 112–115; 363/62–65
See application file for complete search history.

(56) References Cited

U.S. PATENT DOCUMENTS

| | | | | |
|---|---|---|---|---|
| 5,325,363 A * | 6/1994 | Lui | ................................ | 714/6 |
| 5,396,596 A * | 3/1995 | Hashemi et al. | ............. | 711/113 |
| 5,453,765 A * | 9/1995 | Yamaguchi et al. | ......... | 347/179 |
| 5,768,117 A * | 6/1998 | Takahashi et al. | ............. | 363/65 |
| 6,230,217 B1* | 5/2001 | Tuccio et al. | ................... | 710/8 |
| 6,230,221 B1* | 5/2001 | Mulvey et al. | ................ | 710/62 |
| 6,597,073 B1* | 7/2003 | Check | ........................... | 307/64 |
| 6,742,068 B1* | 5/2004 | Gallagher et al. | ........... | 710/302 |
| 2002/0026595 A1* | 2/2002 | Saitou et al. | ................ | 713/300 |

* cited by examiner

*Primary Examiner*—Donald Sparks
*Assistant Examiner*—Hahem Farrokh

(57) ABSTRACT

A data storage interface for coupling data between processors and a bank of disk. The interface includes a plurality of first directors coupled to the processors and a plurality of second directors coupled to the bank of disk drives. A cache memory is coupled between the plurality of first directors and the plurality of second directors. The interface includes a pair of independent power busses. At least one of the first or second directors is coupled to the pair of independent power busses. One portion of the disk drives in the bank is connected to only a first one of the pair of power buses and a different portion of the disk drives is connected to only the other one of the pair of power buses. A power circuit includes a pair of input terminals, each one being electrically connected to a corresponding one of the pair of independent power busses. The circuit includes an output terminal. A pair of switching transistor sections is provided. The transistor switching sections is serially connected between a corresponding one of the pair of input terminals and the output terminal. A logic network is provided for operating the switching sections to prevent current passing into one of the pair of input terminals from one of the power busses from passing into the other one of the power buses. The logic section operates the switching sections to prevent current from one of the pair of power buses to the one of the input terminals connected thereto from exceeding a predetermined value, and operates the switching sections to prevent a difference between a voltage at one of the input terminals and a voltage at the other one of the input terminals from exceeding a predetermined value.

11 Claims, 9 Drawing Sheets

DUAL POWER BUS DATA STORAGE SYSTEM

This application incorporates by reference, in their entirety, the following co-pending patent applications all assigned to the same assignee as the present invention:

| INVENTORS | FILING DATE | Ser. No. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |

TECHNICAL FIELD

This invention relates generally to data storage systems, and more particularly to data storage systems having redundancy arrangements to protect against total system failure in the event of a failure in a component or subassembly of the storage system.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board. In order to provide data integrity in case of a failure in a director, the backplane printed circuit board has a pair of buses. One set the disk directors is connected to one bus and another set of the disk directors is connected to the other bus. Likewise, one set the host computer/server directors is connected to one bus and another set of the host computer/server directors is directors connected to the other bus. The cache memories are connected to both buses. Each one of the buses provides data, address and control information.

SUMMARY OF THE INVENTION

The details of one or more embodiments of the invention are set forth in the accompanying drawings and the description below. Other features, objects, and advantages of the invention will be apparent from the description and drawings, and from the claims.

In accordance with one feature of the invention, a data storage interface is provided for coupling data between processors and a bank of disk. The interface includes a plurality of first directors coupled to the processors and a plurality of second directors coupled to the bank of disk drives. A cache memory is coupled between the plurality of first directors and the plurality of second directors. The interface includes a pair of independent power busses. At least one of the first or second directors is coupled to the pair of independent power busses.

In accordance with another feature of the invention, a data storage interface is provided for coupling data between processors and a bank of disk, such interface comprising. The interface includes a plurality of first directors coupled to the processors. A plurality of second directors is coupled to the bank of disk drives. A cache memory is coupled between the plurality of first directors and the plurality of second directors; a pair of independent power busses. One portion of the disk drives in the bank is connected to only a first one of the pair of power buses and a different portion of the disk drives is connected to only the other one of the pair of power buses.

In one embodiment, the second directors are arranged in pairs and wherein the disk drives are arranged in pairs, each one of the pairs of second directors being coupled to a corresponding one of the pairs of disk drives.

In one embodiment, a first one of the disk drives in each of the pairs thereof is connected to one of the pair of power buses and a second one of the disk drives in each one of the pairs thereof is connected to the other one of the pair of power buses.

In accordance with another feature of the invention, a data storage interface is provided for coupling data between processors and a bank of disk. The interface includes a plurality of first director boards, each one of the first director boards having a plurality of first directors. The first directors are coupled to the processors. The interface includes a plurality of second director boards, each one of the second director boards having a plurality of second directors. The second directors are coupled to the bank of disk drives. A cache memory is coupled between the plurality of first directors and the plurality of second directors. A pair of independent power busses is provided. At least one of the first or second director boards is coupled to the pair of independent power busses. The at least one of the first and second director boards includes a power circuit. The power circuit includes a pair of input terminals, each one being electrically connected to a corresponding one of the pair of independent power busses. The circuit includes an output terminal. A pair of switching transistor sections is provided. The transistor switching sections is serially connected between a corresponding one of the pair of input terminals and the output terminal. A logic network is provided for operating the switching sections to minimize current passing into one of the pair of input terminals from one of the power busses from passing into the other one of the power buses.

In one embodiment, the logic section operates the switching sections to prevent current from one of the pair of power buses to the one of the input terminals connected thereto from exceeding a predetermined value.

In one embodiment the logic section operates the switching sections to prevent any reverse current from flowing if a difference between a voltage at one of the input terminals and a voltage at the other one of the input terminals exceed a predetermined value.

In one embodiment, the at least one of the first and second director boards has thereon a DC/DC converter section. The DC/DC converter section is connected to the output terminal and produces a plurality of different output voltages.

DESCRIPTION OF DRAWINGS

These and other features of the invention will become more readily apparent from the following detailed description when read together with the accompanying drawings, in which.

DETAILED DESCRIPTION

Figure 1:
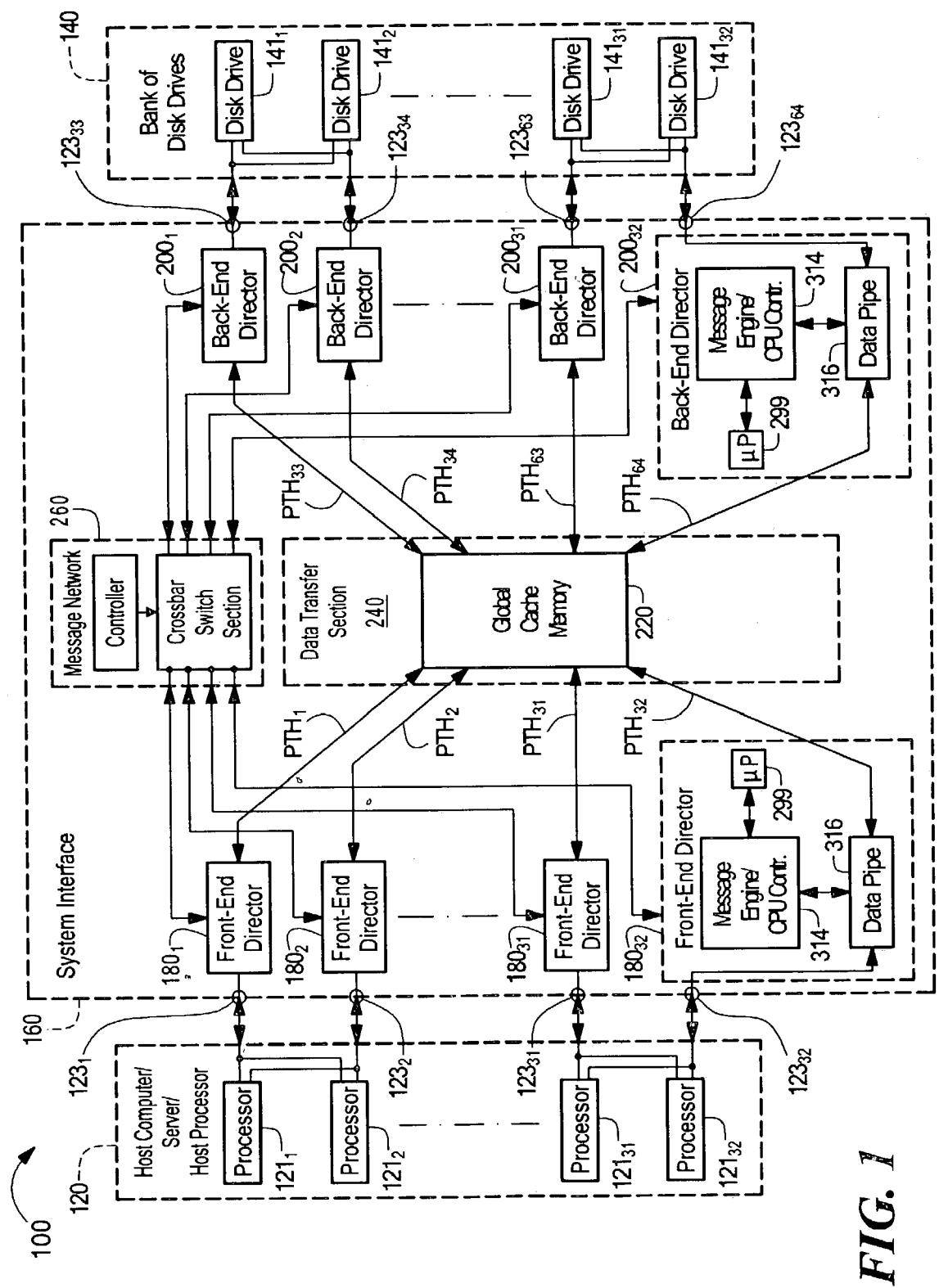
FIG. 1 is a block diagram of a data storage system according to the invention.

Referring now to FIG. 1, a data storage system 100 is shown for transferring data between a host computer/server 120 and a bank of disk drives 140 through a system interface 160. The system interface 160 includes: a plurality of, here 32 front-end directors $180_1$–$180_{32}$ coupled to the host computer/server 120 via ports $123_1$–$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{16}$ and the back-end directors $200_1$–$200_{16}$; and a messaging network 260, operative independently of the data transfer section 240, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar and include a microprocessor (µP) 299 (i.e., a central processing unit (CPU) and RAM), a message engine/CPU controller 314 and a data pipe 316, described in detail in the co-pending patent applications referred to above. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the messaging network 260. The messages facilitate the data transfer between host computer/server 120 and the bank of disk drives 140 with such data passing through the global cache memory 220 via the data transfer section 240.

It is noted that in the host computer 120, each one of the host computer processors $121_1$–$121_{32}$ is coupled to here a pair (but not limited to a pair) of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $141_1$–$141_{32}$, each disk drive $141_1$–$141_{32}$ being coupled to here a pair (but not limited to a pair) of the back-end directors $200_1$–$200_{32}$, to provide redundancy in the event of a failure in one of the back-end directors $200_1$–$200_{32}$ coupled thereto). Thus, front-end director pairs $180_1$, $180_2$; . . . $180_{31}$, $180_{32}$ are coupled to processor pairs $121_1$, $121_2$; . . . $121_{31}$, $121_{32}$, respectively, as shown. Likewise, back-end director pairs $200_1$, $200_2$; . . . $200_{31}$, $200_{32}$ are coupled to disk drive pairs $141_1$, $141_2$; . . . $141_{31}$, $141_{32}$, respectively, as shown.

Figure 2:
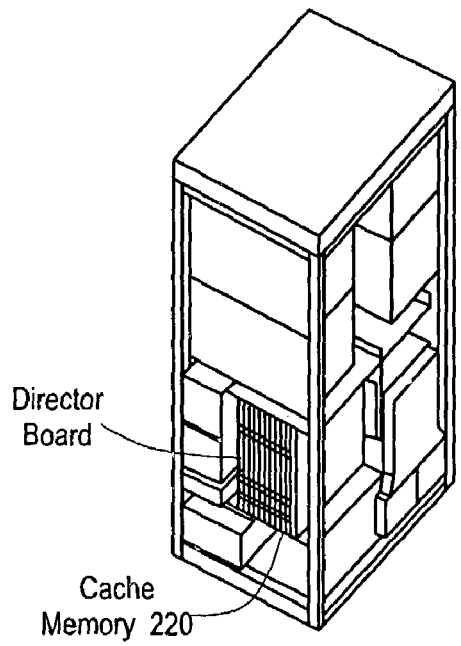
FIG. 2 is a sketch of an electrical cabinet storing a system interface used in the data storage system of FIG. 2.
Figure 3:
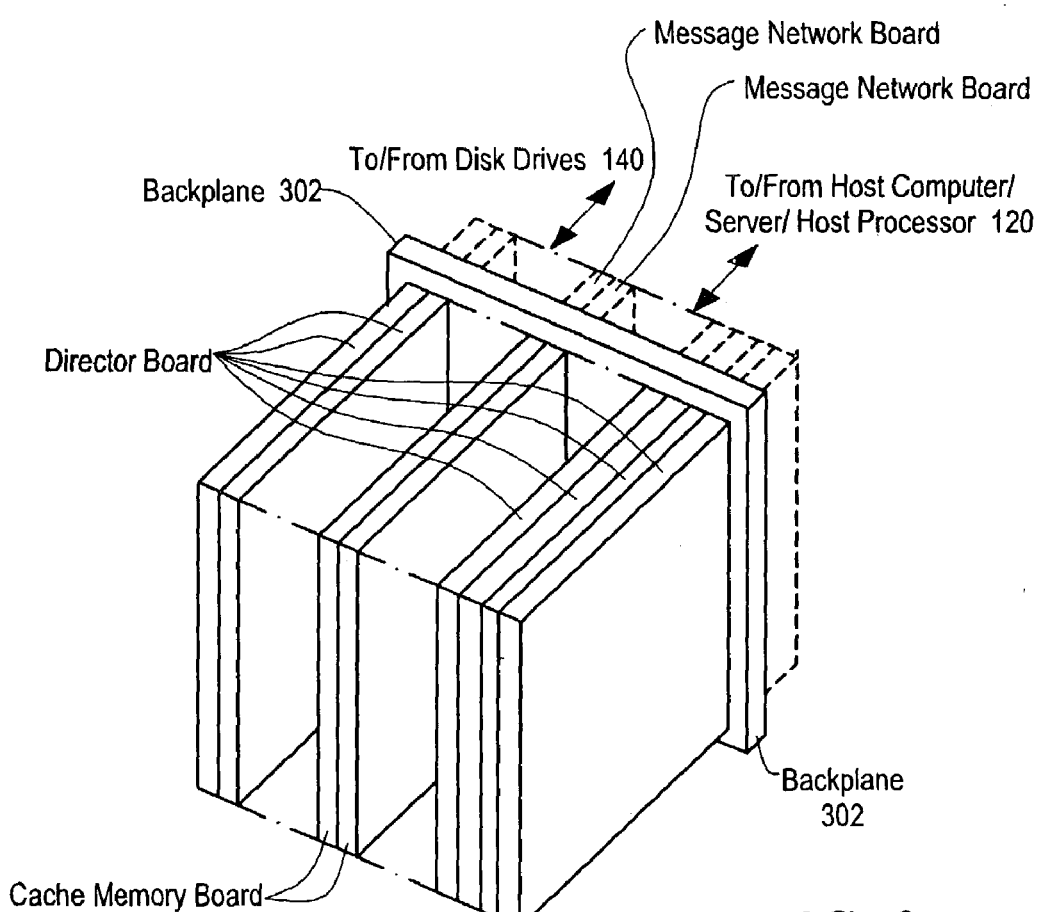
FIG. 3 is a diagramatical, isometric sketch showing printed circuit boards providing the system interface of the data storage system of FIG. 1.

Referring now to FIGS. 2, and 3, the system interface 160 is shown to include an electrical cabinet 300 having stored therein: a plurality of, here eight front-end director boards $190_1$–$190_8$, each one having here four of the front-end directors $180_1$–$180_{32}$; a plurality of, here eight back-end director boards $210_1$–$210_8$, each one having here four of the back-end directors $200_1$–$200_{32}$; and a plurality of, here eight, memory boards M0–M7 which together make up the global cache memory 220. These boards plug into the front side of a backplane 302. (It is noted that the backplane 302 is a mid-plane printed circuit board). Plugged into the backside of the backplane 302 are message network boards which together make up the message network 260 as described in the co-pending patent applications referred to above. The backside of the backplane 302 has plugged into it adapter boards, not shown in FIGS. 2–4, which couple the boards plugged into the back-side of the backplane 302 with the computer 120 and the bank of disk drives 140 as shown in FIG. 1.

That is, referring again briefly to FIG. 1, an I/O adapter, not shown, is coupled between each one of the front-end (FE) directors $180_1$–$180_{32}$ and the host computer 120 and an I/O adapter, not shown, is coupled between each one of the back-end (BE) directors $200_1$–$200_{32}$ and the bank of disk drives 140.

Figure 4:
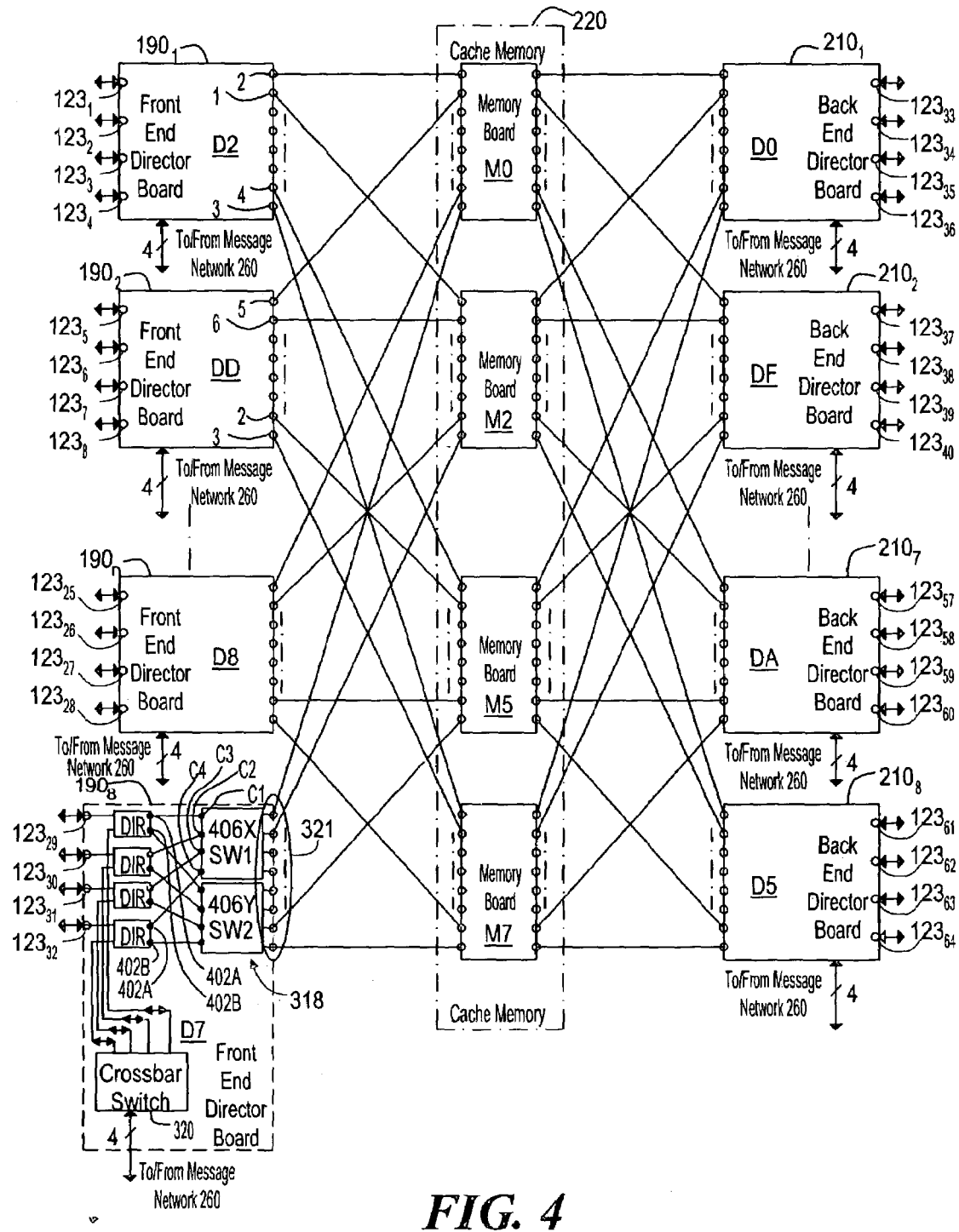
FIG. 4 is a block diagram of the system interface used in the data storage system of FIG. 1.

Referring now to FIG. 4, and as described in more in the co-pending patent applications referred to above, each one of the director boards $190_1$–$210_8$ includes, as noted above four of the directors $180_1$–$180_{32}$, $200_1$–$200_{32}$ (FIG. 1). It is noted that the director boards $190_1$–$190_8$ having four front-end directors per board, $180_1$–$180_{32}$ are referred to as front-end directors and the director boards $210_1$–$210_8$ having four back-end directors per board, $200_1$–$200_{32}$ are referred to as back-end directors. Each one of the directors $180_1$–$180_{32}$, $200_1$–$200_{32}$ includes the microprocessor 299 referred to above), the message engine/CPU controller 314, and the data pipe 316 shown in FIG. 1.

The front-end director boards have ports $123_1$–$123_{32}$, as shown in FIG. 1, coupled to the processors $121_1$–$121_{32}$, as shown. The back-end director boards have ports $123_{33}$–$123_{64}$, as shown in FIG. 2, coupled to the disk drives $141_1$–$141_{32}$, as shown.

Each one of the director boards $190_1$–$210_8$ includes a crossbar switch 318 as shown in FIG. 4. The crossbar switch 318 has four input/output ports $C_1$–$C_4$, each one being coupled to the data pipe 316 (FIG. 1) of a corresponding one of the four directors $180_1$–$180_{32}$, $200_1$–$200_{32}$ on the director board $190_1$–$210_8$. The crossbar switch 318 has eight output/input ports collectively identified in FIG. 4 by numerical designation 321 (which plug into the backplane 302). The crossbar switch 318 on the front-end director boards $191_1$–$191_8$ is used for coupling the data pipe 316 of a selected one of the four front-end directors $180_1$–$180_{32}$ on the front-end director board $190_1$–$190_8$ to the global cache memory 220 via the backplane 302 and I/O adapter, not shown. The crossbar switch 318 on the back-end director boards $210_1$–$210_8$ is used for coupling the data pipe 316 of a selected one of the four back-end directors $200_1$–$200_{32}$ on the back-end director board $210_1$–$210_8$ to the global cache memory 220 via the backplane 302 and I/O adapter, not shown. Thus, referring to FIG. 2, the data pipe 316 in the front-end directors $180_1$–$180_{32}$ couples data between the host computer 120 and the global cache memory 220 while the data pipe 316 in the back-end directors $200_1$–$200_{32}$ couples data between the bank of disk drives 140 and the global cache memory 220. It is noted that there are separate point-to-point data paths $PTH_1$–$PTH_{64}$ (FIG. 1) between each one of the directors $180_1$–$180_{32}$, $200_1$–$200_{32}$ and the global cache memory 220. It is also noted that the backplane 302 is a passive backplane because it is made up of only etched conductors on one or more layers of a printed circuit board. That is, the backplane 302 does not have any active components.

Further, as described in the co-pending patent applications referred to above, crossbar switch 320 (FIG. 4) plugs into the backplane 302 and is used for coupling to the directors to the message network 260 (FIG. 1) through the backplane.

Referring again to FIG. 4, the crossbar switch 318 includes a pair of crossbar switches 406X, 406Y. Each one of the switches 406X, 406Y includes four input/output director-side ports $C_1$–$C_4$ and the four input/output memory-side ports collectively designated in FIG. 5 by numerical designation 321. The director-side ports $C_1$–$C_4$ of switch 406X are connected to the four directors on the director board, as indicated, and as described in more detail in the co-pending patent applications referred to above. Likewise, director-side ports $C_1$–$C_4$ of switch 406Y are also connected to the dual-ported directors on such board, as indicated. Thus, as described in the co-pending patent applications referred to above, each director is a dual-ported director.

Figure 8:
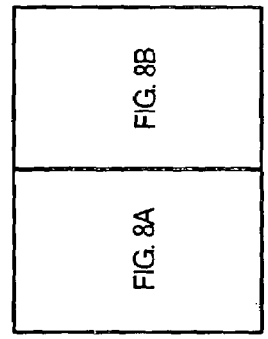
FIG. 8 shows the relationship between FIGS. 8A and 8B which together are a flow diagram used in logic of the power circuit of FIG. 7.

Each one of the ports $C_1$–$C_4$ may be coupled to a selected one of the four ports collectively designated by 321 in accordance with control words provided to the switch 406X by the directors on such board, respectively, as described in the above-referenced patent application. Suffice it to say here, that port 402A of any one of the directors $180_1$, $180_3$, $180_5$, $180_7$ may be coupled to any one of the ports 321 of switch 406X, selectively in accordance with the control words. The coupling between the director boards $190_1$–$190_8$, $210_1$–$210_8$ and the global cache memory 220 is shown in FIG. 8. Likewise for switch 406Y.

More particularly, and referring also to FIG. 1, as noted above, each one of the host computer processors $121_1$–$121_{32}$ in the host computer 120 is coupled to a pair of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $141_1$–$141_{32}$, each disk drive $141_1$–$141_{32}$ being coupled to a pair of the back-end directors $200_1$–$200_{32}$, to provide redundancy in the event of a failure in one of the back-end directors $200_1$–$200_{32}$ coupled thereto). Thus, considering exemplary host computer processor $121_1$, such processor $121_1$ is coupled to a pair of front-end directors $180_1$, $180_2$. Thus, if director $180_1$ fails, the host computer processor $121_1$ can still access the system interface 160, albeit by the other front-end director $180_2$. Thus, directors $180_1$ and $180_2$ are considered redundancy pairs of directors. Likewise, other redundancy pairs of front-end directors are: front-end directors $180_3$, $180_4$; $180_5$, $180_6$; $180_7$, $180_8$; $180_9$, $180_{10}$; $180_{11}$, $180_{12}$; $180_{13}$, $180_{14}$; $180_{15}$, $180_{16}$; $180_{17}$, $180_{18}$; $180_{19}$, $180_{20}$; $180_{21}$, $180_{22}$; $180_{23}$, $180_{24}$; $180_{25}$, $180_{26}$; $180_{27}$, $180_{28}$; $180_{29}$, $180_{30}$; and $180_{31}$, $180_{32}$ (only directors $180_{31}$ and $180_{32}$ being shown in FIG. 1).

Likewise, disk drive $141_1$ is coupled to a pair of back-end directors $200_1$, $200_2$. Thus, if director $200_1$ fails, the disk drive $141_1$ can still access the system interface 160, albeit by the other back-end director $180_2$. Thus, directors $200_1$ and $200_2$ are considered redundancy pairs of directors. Likewise, other redundancy pairs of back-end directors are: back-end directors $200_3$, $200_4$; $200_5$, $200_6$; $200_7$, $200_8$; $200_9$, $200_{10}$; $200_{11}$, $200_{12}$; $200_{13}$, $200_{14}$; $200_{15}$, $200_{16}$; $200_{17}$, $200_{18}$; $200_{19}$, $200_{20}$; $200_{21}$, $200_{22}$; $200_{23}$, $200_{24}$; $200_{25}$, $200_{26}$; $200_{27}$, $200_{28}$; $200_{29}$, $200_{30}$; and $200_{31}$, $200_{32}$ (only directors $200_{31}$ and $200_{32}$ being shown in FIG. 1).

As noted above, there are four directors on each one of the director boards. The physical position of the director boards along with a positional designation, are shown in FIG. 4 (e.g., director board $190_1$ also has the designation D2). Further, Thus, referring to FIGS. 1 and 4:

| FRONT-END DIRECTOR BOARD | FRONT-END DIRECTORS ON THE FRONT-END DIRECTOR BOARD |
|---|---|
| $190_1$ (D2) | $180_1$, $180_3$, $180_5$, $180_7$ |
| $190_1$ (DD) | $180_2$, $180_4$, $180_6$, $180_8$ |
| $190_2$ (D3) | $180_9$, $180_{11}$, $180_{13}$, $180_{15}$ |
| $190_3$ (DC) | $180_{10}$, $180_{12}$, $180_{14}$, $180_{16}$ |
| $190_4$ (D9) | $180_{17}$, $180_{19}$, $180_{21}$, $180_{23}$ |
| $190_5$ (D6) | $180_{18}$, $180_{20}$, $180_{22}$, $180_{24}$ |
| $190_6$ (D8) | $180_{25}$, $180_{27}$, $180_{29}$, $180_{31}$ |
| $190_7$ (D7) | $180_{26}$, $180_{28}$, $180_{30}$, $180_{32}$ |

| BACK-END DIRECTOR BOARD | BACK-END DIRECTORS ON THE BACK-END DIRECTOR BOARD |
|---|---|
| $210_1$ (D0) | $200_1$, $200_3$, $200_5$, $200_7$ |
| $210_1$ (DF) | $200_2$, $200_4$, $200_6$, $200_8$ |
| $210_2$ (D2) | $200_9$, $200_{11}$, $200_{13}$, $200_{15}$ |

-continued

| BACK-END DIRECTOR BOARD | BACK-END DIRECTORS ON THE BACK-END DIRECTOR BOARD |
|---|---|
| $210_3$ (DE) | $200_{10}, 200_{12}, 200_{14}, 200_{16}$ |
| $210_4$ (DB) | $200_{17}, 200_{19}, 200_{21}, 200_{23}$ |
| $210_5$ (D4) | $200_{18}, 200_{20}, 200_{22}, 200_{24}$ |
| $210_6$ (DA) | $200_{25}, 200_{27}, 200_{29}, 200_{31}$ |
| $210_7$ (D5) | $200_{26}, 200_{28}, 200_{30}, 200_{32}$ |

Thus, to provide the redundant pairs of directors described above, the following director boards are paired to enable achievement of the above-described redundancy:
Front-end boards:
D2 and DD
D3 and DC
D9 and D6
D8 and D7
Back-end boards
D0 and DF
D2 and DE
DB and D4
DA and D5

Further, referring also to FIG. 4, the global cache memory 220 includes a plurality of, here eight, cache memory boards M0–M7, as shown.

Figure 5:
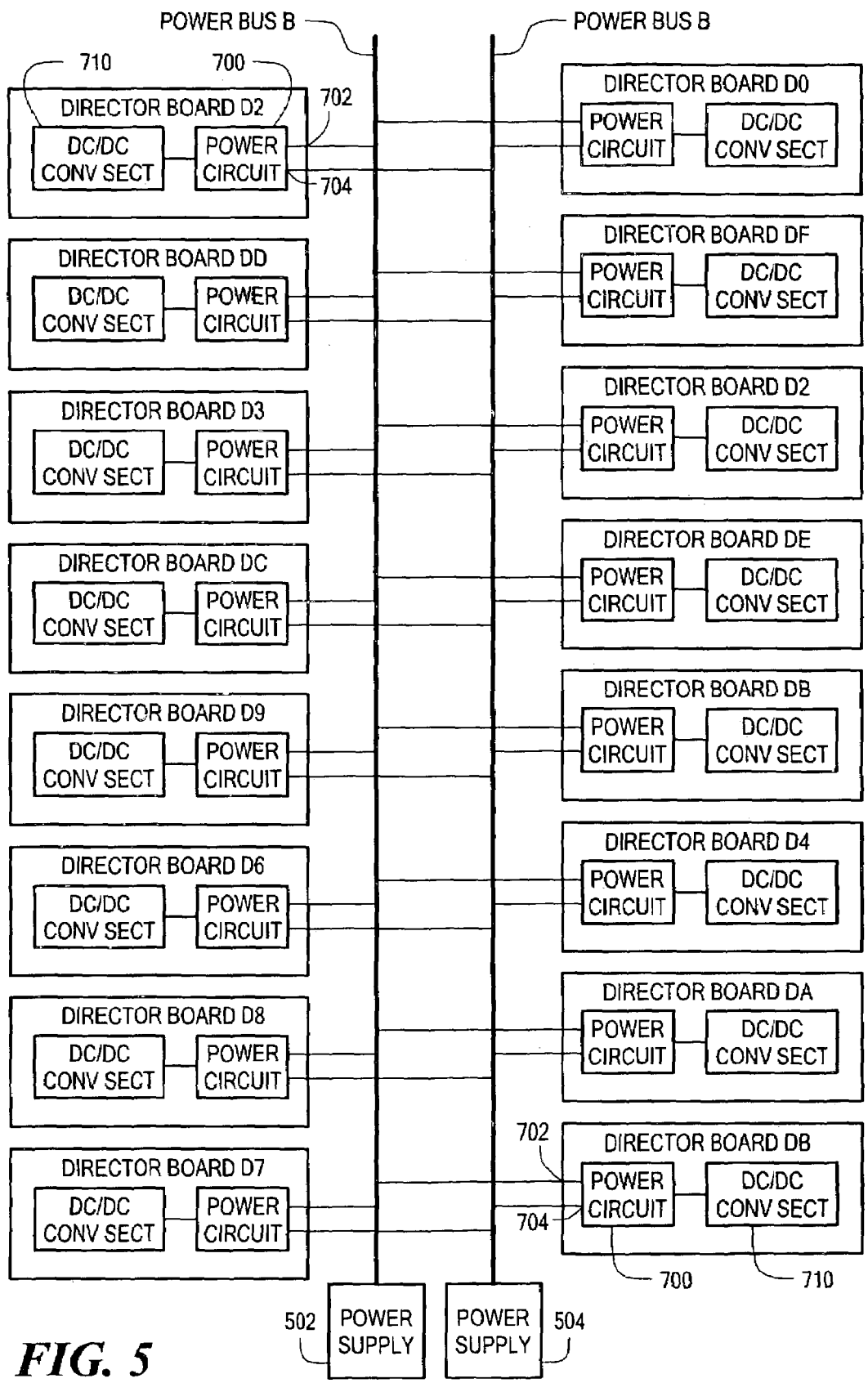
FIG. 5 is a diagram showing the power connects to the director boards used in the system interface of FIG. 2.
Figure 7:
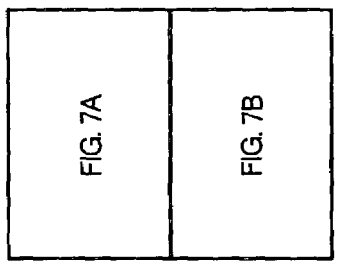
FIG. 7 shows the relationship between FIGS. 7A and 7B which together are a diagram of a power circuit used in the director boards of FIG. 5.

Referring now to FIG. 5, here, in this embodiment, each one of the director boards includes a power circuit to be described in more detail in FIGS. 7 and 8. Suffice it to say here that each one of the directors is connected, via the power circuit 700 (to be described in more detail in FIG. 7) therein, to pair of power busses, a power bus A and a power bus B. Each one of the power busses is connected to a corresponding one of a pair on independent, redundant, power supplies, 502, 504. The power supplies 502 and 504 are identical in construction and are designed to produce, when operating properly, the same output voltage for the power busses A and B, respectively.

Figure 6:
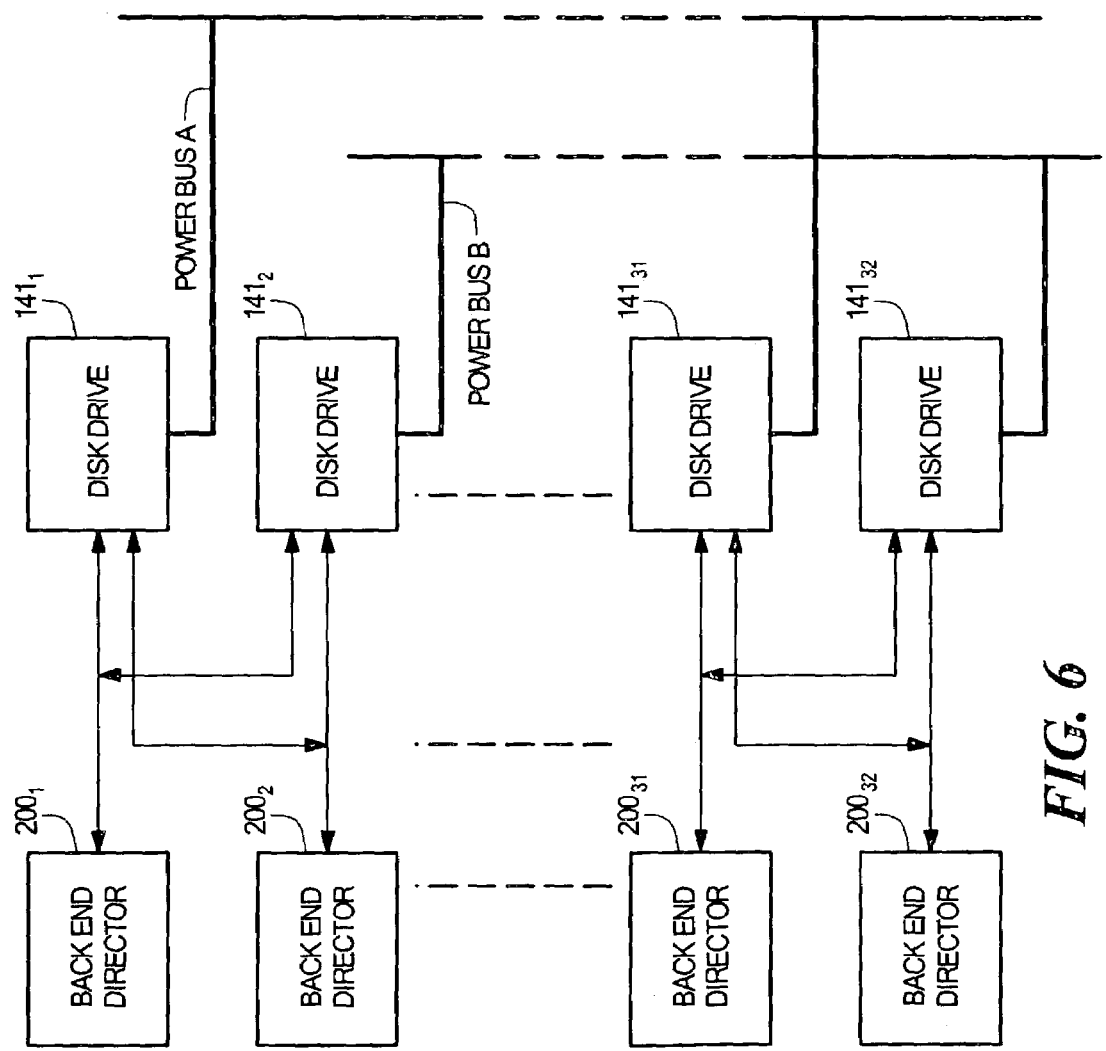
FIG. 6 is a diagram showing the power connects to the disk drives used in the system interface of FIG. 2.
Figure 7A:
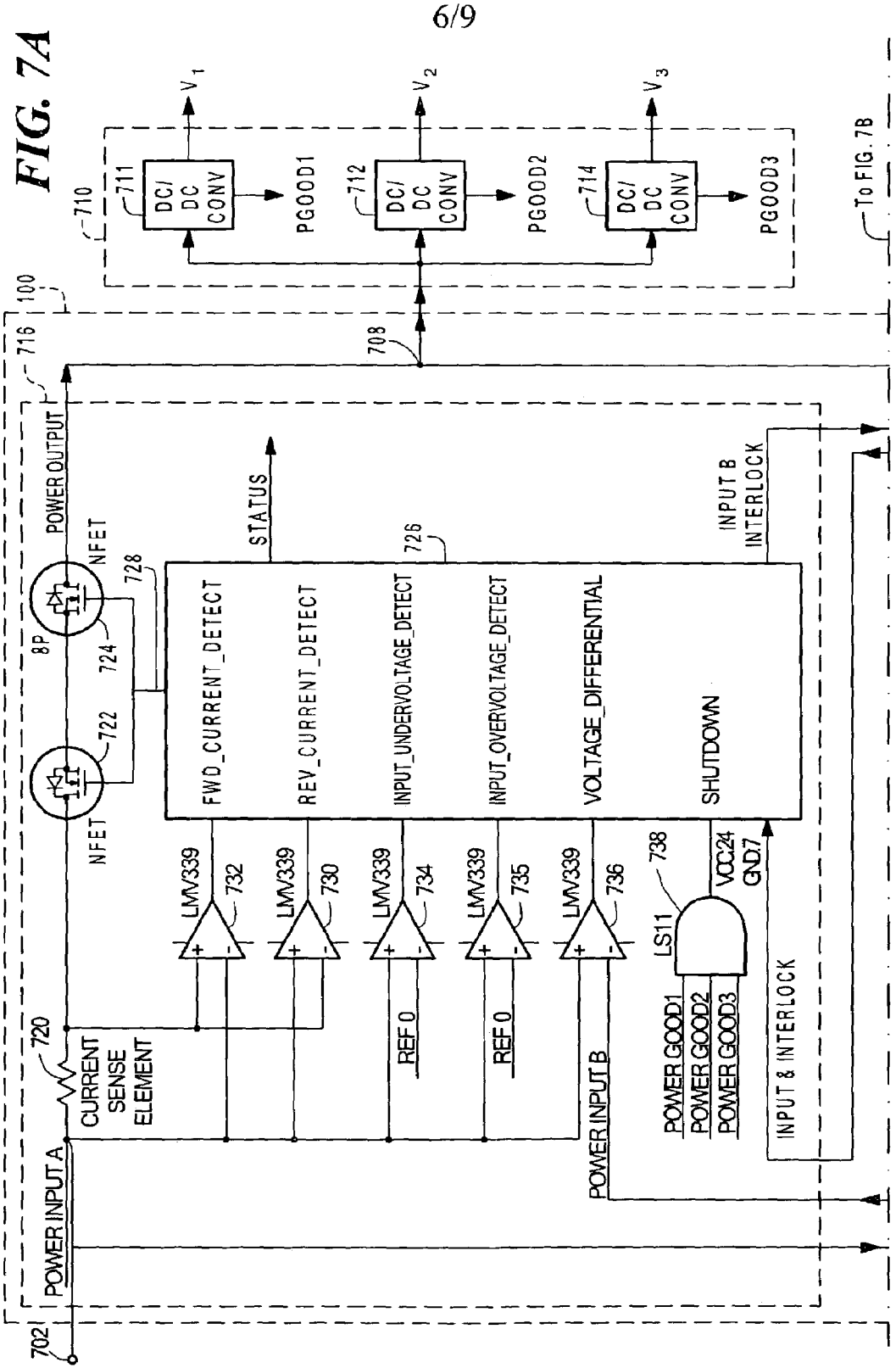
Figure 7B:
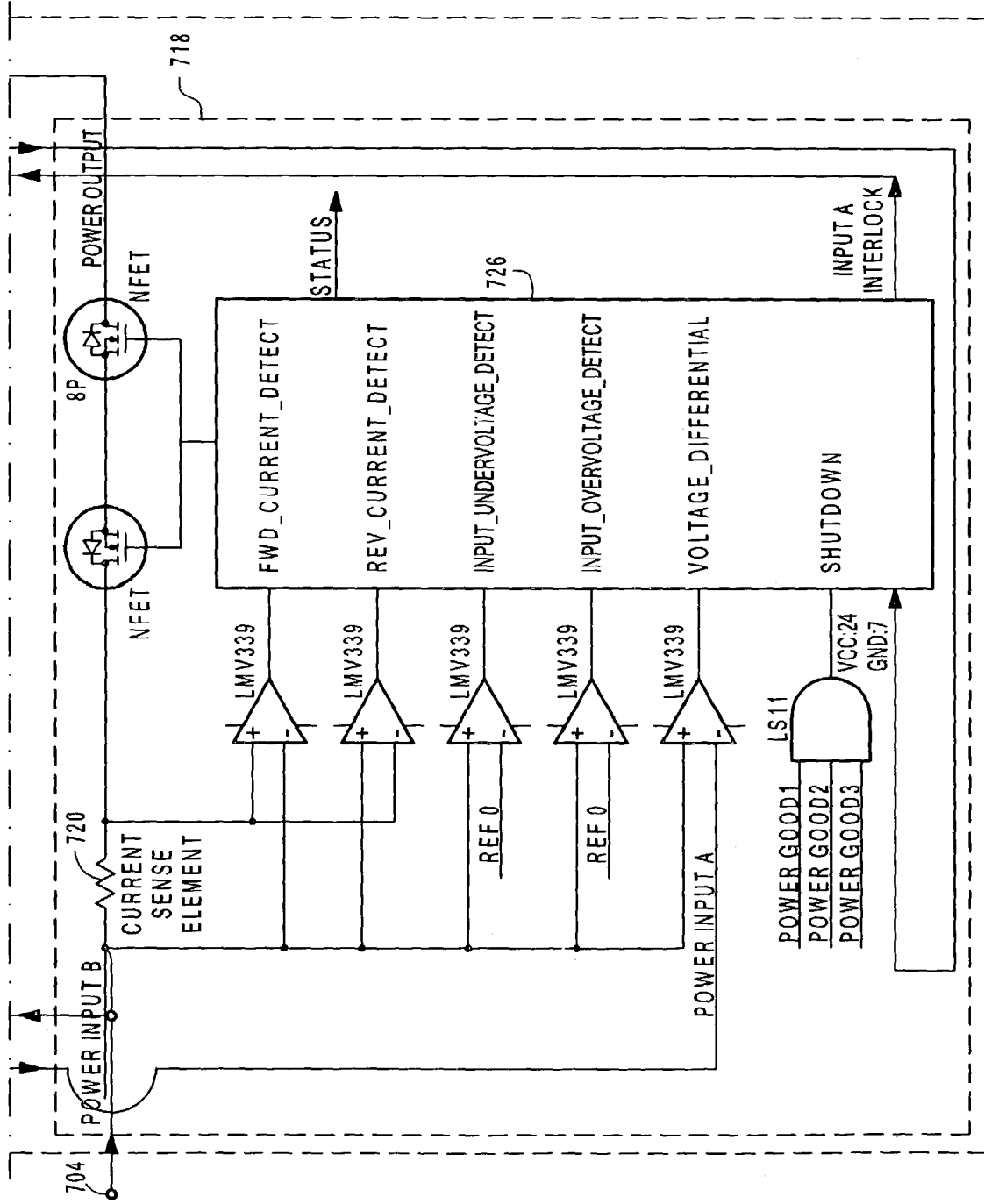
Figure 8A:
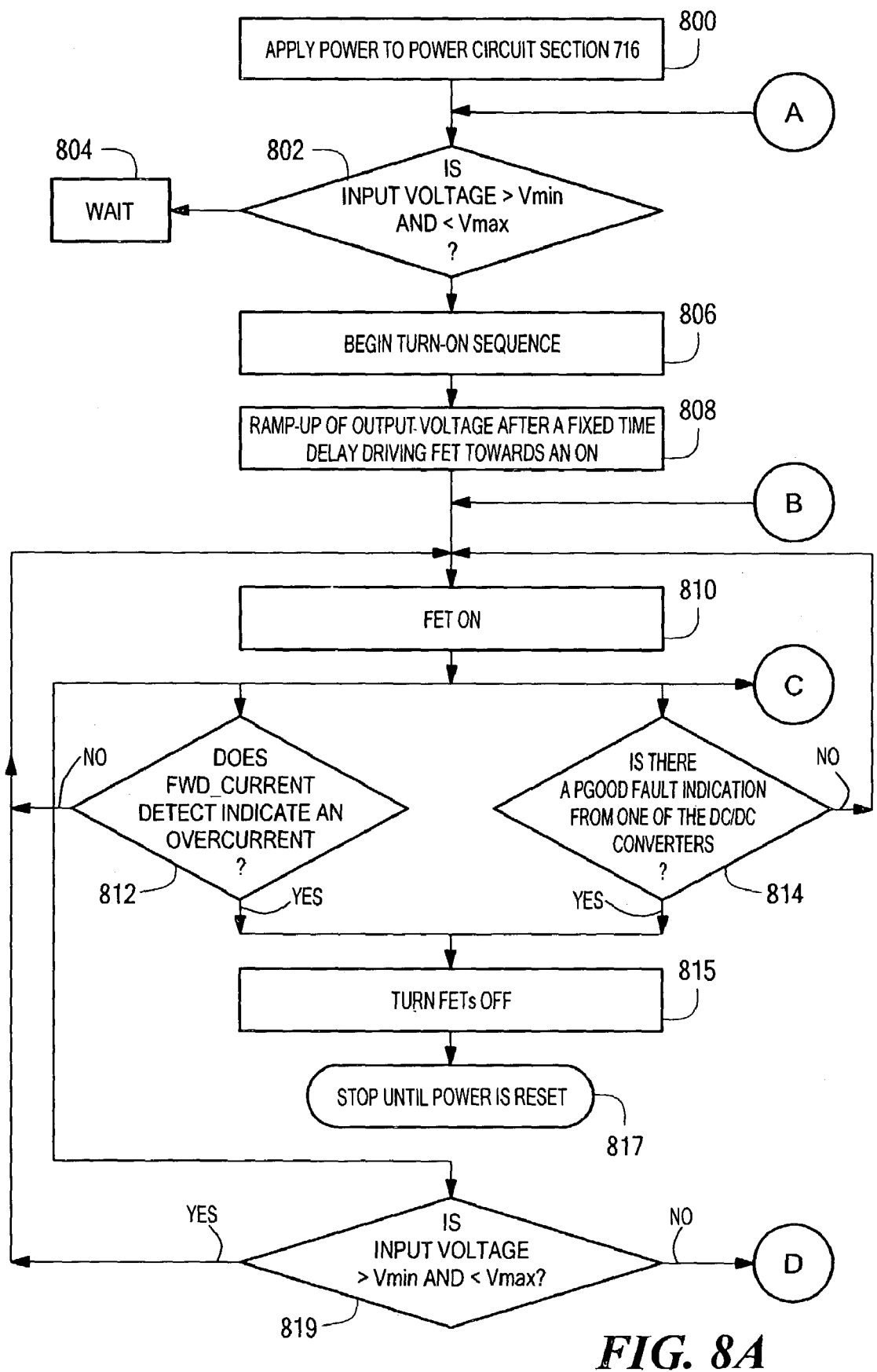
Figure 8B:
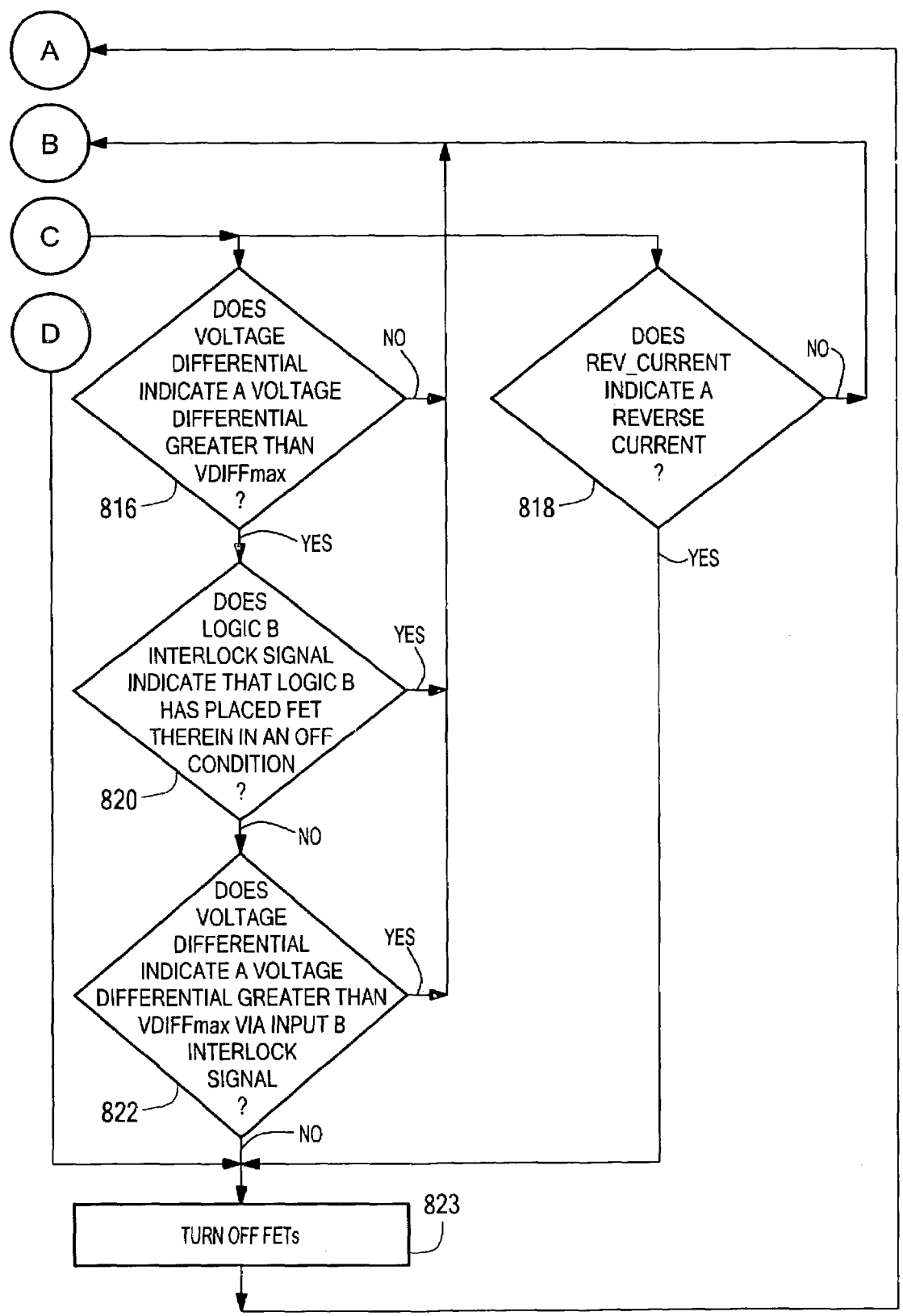

Referring now to FIG. 6, as described above in connection with FIG. 1, pairs of back end directors are connected to pairs of disk drives. Thus, for example, back end director $200_1$ is connected to the pair of disk drives $141_1$ and $141_2$. Likewise back end director $200_2$ is connected to disk drive $141_2$. As described in the patent applications referred to above, in a dual write mode, data passing through director $200_1$ may be written into both disk drives $141_1$ and $141_2$. Thus, both disk drives $141_1$ and $141_2$ may store the same data. Further, disk drive $141_1$ may be retrieved from either director $200_1$ or $200_2$. Likewise, data in disk drive $141_2$ may be retrieved from either director $200_1$ or $200_2$. Therefore, the directors $200_1$ and $200_2$ may be considered as paired directors and disk drives $141_1$ and $141_2$ may be considered as paired disk drives.

As described above in connection with FIG. 5, a pair of power buses, Bus A and Bus B is provided. One each of the disk provided in the paired disk drives is connected to a different one of the pair of power busses. Thus, disk drive $141_1$ is connected to power bus A and disk drive $141_2$ is connected to power bus B. Likewise, continuing directors $200_{31}$ and $200_{32}$ are paired directors and are connected to paired disk drives $141_{31}$ and $141_{32}$, as shown. Thus, disk drive $141_{31}$ is connected to power bus A and director $141_{32}$ is connected to power bus B, as shown.

Referring now to FIG. 7, an exemplary one of the power circuits 700 used on the director boards is shown. The circuit 700 is connected to both power buses, i.e., terminal 702 of power bus A and terminal 704 of power bus B, as shown. The circuit 700 has an output terminal 708. The output terminal 709 is connected to a DC/DC converter section 710 having a plurality of, here three, DC/DC converters 711, 712, 714 producing different voltages $V_1$, $V_2$, and $V_3$, as indicated. These voltages are used by electrical components on the director board.

The circuit 700 includes two sections 716, 718, each identical in construction. Thus, considering an exemplary one of the sections 716, 718, here section 716, such section 716 includes a current sensing resistor 720 and a pair of serially connected FETs 722, 724, coupled between power bus A terminal 702 and the output terminal 708. Thus, the power bus A will become electrically connected to output terminal 708 when the pair of FETs 722, 724 are turned "on" (i.e., conducing) and will be electrically de-coupled from the output terminal 798 when the FETs 722, 724 are "off" (non-conducting). Here the FETs 722, 724 are bi-directional MOSFET power switching devices. Controlling the "on" or "off" condition of the FETs 722, 724 is a logic circuit 726 having an output 728 which controls the gates of the FETs 722, 724 in a manner to be described in connection with FIG. 8. Suffice it to say here that the logic circuit 726 received the following inputs: FWD_CURRENT_DETECT; REV_CURRENT_DETECT; INPUT_UNDERVOLTAGE_DETECT; INPUT_OVERVOLTAGE_DETECT; VOLTAGE_DIFFERENTIAL; SHUTDOWN; and INTERLOCK.

The input REV_DETECT is provided by the output of compartor 730, such comparator 730 being connected across the resistor 720, as shown. The comparator 730 produces one logic state, here, for example, a logic 0, at its output if the polarity of the voltage produced across the resistor 720 indicated that such current is flowing from the output terminal 708 to the power bus A terminal 702 (i.e., a reverse current). Thus, if the potential at the left terminal of the resistor 720 is positive relative to the potential on the right terminal of the resistor 720 (i.e., a forward current from the power bus A terminal 702 to the output terminal 708 of the circuit), a logic 1 is produced by the compartor 730. On the other hand, if the potential at the left terminal of the resistor 720 is negative relative to the potential on the right terminal of the resistor 720 (i.e., indicating current from the output terminal 708 to the power bus A terminal 702, a reverse current), a logic 0 is produced by the compartor 730.

The input FWD_DETECT is provided by the output of compartor 732, such comparator 732 being connected across the resistor 720, as shown. The comparator 732 produces one logic state, here, for example, a logic 0, at its output if the current through the resistor 720 is greater than a predetermined, maximum forward current, value and the opposite logic state, here a logic 1, if the current through the resistor 720 is less than, or equal to, the predetermined maximum forward current value.

The input INPUT_UNDERVOLTAGE_DETECT is provided by comparator 734, such comparator 734 being connected to the power bus A input terminal 702 and a reference potential, REFU, representative of a minimum acceptable voltage, $V_{min}$, at the power bus A input terminal. If the voltage at power bus A is greater than $V_{min}$, a logic 1 is produced by the compartor 734; otherwise, a logic 1 is produced.

The input INPUT_OVERVOLTAGE_DETECT is provided by comparator 735, such comparator 735 being connected to the power bus A input terminal 702 and a reference potential, REFO, representative of a maximum acceptable voltage, $V_{max}$, at the power bus A input terminal. If the voltage at power bus A is less than $V_{max}$, a logic 1 is produced by the compartor 735; otherwise, a logic 1 is produced.

The input VOLTAGE_DIFFERENTIAL is provided by comparator 736, such compartor 736 having one input connected to the power bus A input terminal 702 and the other input connected to the power bus B terminal 704. If the voltage difference between the voltage at the power A terminal 702 is greater than the voltage at the power B terminal 704 by a predetermined voltage difference, Vdiffmax, the compartor 736 produces a logic 0; otherwise, such comparator produces a logic 1.

An AND gate 738 is fed by POWER_GOOD (PGOOD1, PGOOD2, PGOOD3) signals provided by each of the plurality of DC/DC converters 711, 712, 714. If any one of the DC/DC converters 711, 712, 714 is not operating properly, a logic 1 is produced by such converters 711, 712, 714. Thus, if any one of the DC/DC converters 711, 712, 714 is not operating properly, the AND gate 738 produces a logic 0; otherwise it produces a logic 1. The signal produced by the AND gate 738 is indicated as SHUTDOWN.

An INPUT B INTERLOCK signal is produced if either: the FETs 722, 724 have been placed in an "off" condition; or, VOLTAGE_DIFFERENTIAL indicates that the voltage difference between the voltage at the power A terminal 702 is greater than the voltage at the power B terminal 704 by the predetermined voltage difference. Thus, INPUT B INTERLOCK is a two bit signal.

A STATUS signal is produced indicating whether the FETs 722, 724 are "on" or "off".

Referring now to FIG. 8, in Step 800, power is supplied to 716. If the input voltage at terminal 702 is less than $V_{max}$ and greater than $V_{min}$ (from what comparators 734 and 735), the turn-on sequence (Step 806) begins with the FETs 722, 724 turning "on" in a delayed, ramp-like manner, Steps 808, 810; otherwise, the logic waits, Step 804.

When the FETs 722, 724 are "on", the following are monitored: FWD_CURRENT_DETECT (Step 812); SHUTDOWN (Step 814); VOLTAGE_DIFFERENTIAL (Step 816); REV_CURRENT_DETECT (Step 818); and whether the voltage at the bus A input terminal 702 is still within acceptable limits, i.e., whether the input voltage at terminal 702 is less than $V_{max}$ and greater than $V_{min}$ (from INPUT_UNDERVOLTAGE_DETECT and INPUT_OVERVOLTAGE_DETECT).

If in Step 812 FWD_CURRENT_DETECT is a logic 0 indicating that there is an overcurrent, i.e., the current through the resistor 720 is greater than a predetermined, maximum forward current, value, the FETs 722, 724 are turned "off" (step 815) until power is reset (Step 817).

If in Step 814, there is a fault indicated by one of the DC/DC converters 711, 712, or 714, the FETs 722, 724 are turned "off", Step 815 until power is reset (Step 817).

If in Step 816 VOLTAGE_DIFFERENTIAL indicates that the voltage difference between the voltage at the power A terminal 702 is less than or equal to the voltage at the power B terminal 704 by the predetermined voltage difference, Vdiffmax, the FETs remain "on". If in Step 816 VOLTAGE_DIFFERENTIAL indicates that the voltage difference between the voltage at the power A terminal 702 is greater than the voltage at the power B terminal 704 by the predetermined voltage difference, Vdiffmax, a determination is made in Step 820 as to whether the INPUT_B_INTERLOCK signal from section 718 has placed the FETs therein in an "off" condition. If it has placed the, FETs 722, 724 therein in an "off" condition, the FETs in this section 716 remain "on". If it has not placed the, FETs 722, 724 therein in an "off" condition, a determination is made in Step 822 as to whether VOLTAGE_DIFFERENTIAL in section 718 via the INPUT_B_INTERLOCK signal. If it has placed the, FETs 722, 724 therein in an "off" condition, the FETs 722, 724 in this section 716 remain "on". If the INPUT_B_INTERLOCK signal has not placed the, FETs 722, 724 therein in an "off" condition (Step 822), a determination is made in Step 822 as to whether VOLTAGE_DIFFERENTIAL in section 718 via the INPUT_B_INTERLOCK signal. If it has not, the FETs 722, 724 in section 716 are turned "off" (Step 823) and the process recycles by returning to Step 802.

If, in Step 819 the voltage at the bus A input terminal 702 is still within acceptable limits, i.e., whether the input voltage at terminal 702 is less than $V_{max}$ and greater than $V_{min}$, the FETs 722 and 724 remain "on"; otherwise, the are turned "off", Step 823 and the process recycles by returning to Step 802.

Therefore, the logic networks 726, 728 operating the switching sections to: minimize current passing into one of the pair of input terminals from one of the power busses from passing into the other one of the power buses; to prevent current from one of the pair of power buses to the one of the input terminals connected thereto from exceeding a predetermined value; and to prevent any reverse current from flowing if a difference between a voltage at one of the input terminals and a voltage at the other one of the input terminals exceed a predetermined value.

Thus, the power circuit 700 supports use of two input power sources of differing voltages; power ORing; tolerates one input power source shorting to ground; has automatic switchover to other input if one section fails; fast reverse current detection and switch off fault indication if normal forward current is less than a prescribed amount bi-directional MOSFET power switch.

Other embodiments are within the spirit and scope of the appended claims.

What is claimed is:
1. A data storage interface for coupling data between processors and a bank of disk drives, such interface comprising:
    a plurality of first director boards, each one of the first director boards having a plurality of first directors, such first directors being coupled to the processors;
    a plurality of second director boards, each one of the second director boards having a plurality of second directors, such second directors being coupled to the bank of disk drives;
    a cache memory coupled between the plurality of first directors and the plurality of second directors;
    a pair of independent power busses;
    wherein at least one of the first or second director boards is coupled to the pair of independent power busses; and
    wherein said at least one of the first and second director boards includes a power circuit, such power circuit, comprising:
        a pair of input terminals, each one being electrically connected to a corresponding one of the pair of independent power busses;
        an output terminal;
        a pair of switching transistor sections, each one of such transistor switching sections being serially connected between a corresponding one of the pair of input terminals and the output terminal;
        a logic network for operating the switching sections to minimize current passing into one of the pair of input terminals from one of the power busses from passing into the other one of the power buses.

2. A data storage interface for coupling data between processors and a bank of disk drives, such interface comprising:
a plurality of first director boards, each one of the first director boards having a plurality of first directors, such first directors being coupled to the processors;
a plurality of second director boards, each on of the second director boards having a plurality of second directors, such second directors being coupled to the bank of disk drives;
a cache memory coupled between the plurality of first directors and the plurality of second directors;
a pair of independent power busses;
wherein at least one of the first or second director boards is coupled to the pair of independent power busses; and
wherein said at least one of the first and second director boards includes a power circuit, such power circuit, comprising:
a pair of input terminals, each one being electrically connected to a corresponding one of the pair of independent power busses;
an output terminal;
a pair of switching transistor sections, each one of such transistor switching sections being serially connected between at corresponding one of the pair of input terminals and the output terminal;
a logic network for operating the switching sections to prevent current from one of the pair of power buses to the one of the input terminals connected thereto from exceeding a predetermined value.

3. A data storage interface for coupling data between processors and a bank of disk drives, such interface comprising:
a plurality of first director boards, each one of the first director boards having a plurality of first directors, such first directors being coupled to the processors;
a plurality of second director boards, each one of the second director boards having a plurality of second directors, such second directors being coupled to the bank of disk drives;
a cache memory coupled between the plurality of first directors and the plurality of second directors;
a pair of independent power busses;
wherein at least one of the first or second director boards is coupled to the pair of independent power busses; and
wherein said at least one of the first and second director boards includes a power circuit, such power circuit, comprising:
a pair of input terminals, each one being electrically connected to a corresponding one of the pair of independent power busses;
an output terminal;
a pair of switching transistor sections, each one of such transistor switching sections being serially connected between a corresponding one of the pair of input terminals and the output terminal;
a logic network for operating the switching sections to prevent reverse current if a difference between a voltage at one of the input terminals and a voltage at the other one of the input terminals exceeds a predetermined value.

4. A data storage interface for coupling data between processors and a bank of disk drives, such interface comprising:
a plurality of first director boards, each one of the first director boards having a plurality of first directors, such first directors being coupled to the processors;
a plurality of second director boards, each one of the second director boards having a plurality of second directors, such second directors being coupled to the bank of disk drives;
a cache memory coupled between the plurality of first directors and the plurality of second directors;
wherein at least one of the first or second director boards is coupled to the pair of independent power busses;
wherein said at least one of the first and second director boards has thereon a DC/DC converter section, such section providing a plurality of different output voltages;
a pair of independent power busses; wherein said at least one of the first and second director boards includes a power circuit, such power circuit, comprising:
a pair of input terminals, each one being electrically connected to a corresponding one of the pair of independent power busses;
an output terminal connected to an input of the DC/DC converter section;
a pair of switching transistor sections, each one of such transistor switching sections being serially connected bet a corresponding one of the pair of input terminals and the output terminal;
a logic network for operating the switching sections to minimize current passing into one of the pair of input terminals from one of the power busses to pass into the other one of the power buses.

5. The data storage interface recited in claim 4 wherein the logic network operates the switching sections to prevent a difference between a voltage at one of the input terminals and a voltage at the other one of the input terminals from exceeding a predetermined value.

6. The data storage interface recited in claim 4 wherein the logic network operates the switching sections to prevent a reverse current if a difference between a voltage at one of the input terminals and a voltage at the other one of the input terminals from exceeds a predetermined value.

7. The data storage interface recited in claim 5 wherein the logic network operates the switching sections to prevent a reverse current if a difference between a voltage at one of the input terminals and a voltage at the other one of the input terminals from exceeds a predetermined value.

8. The data storage interface recited in claim 1 wherein one portion of the disk drives in the bank is connected to only a first one of the pair of power buses and a different portion of the disk drives is connected to only the other one of the pair of power buses.

9. The data storage interface recited in claim 2 wherein one portion of the disk drives in the bank is connected to only a first one of the pair of power buses and a different portion of the disk drives is connected to only the other one of the pair of power buses.

10. The data storage interface recited in claim 3 wherein one portion of the disk drives in the bank is connected to only a first one of the pair of power buses and a different portion of the disk drives is connected to only the other one of the pair of power buses.

11. The data storage interface recited in claim 4 wherein one portion of the disk drives in the bank is connected to only a first one of the pair of power buses and a different portion of the disk drives is connected to only the other one of the pair of power buses.

* * * * *